United States Patent
Meijer et al.

(10) Patent No.: US 6,334,989 B1
(45) Date of Patent: Jan. 1, 2002

(54) PRODUCTION OF WATER-FREE SODA

(75) Inventors: Johannes Albertus Maria Meijer, Schalkhaar; Robert Michael Geertman, Arnhem; Harald Oosterhof, Delft; Geert-Jan Witkamp, Bergschenhoek; Gerda Maria Van Rosmalen, Delft, all of (NL)

(73) Assignee: Technische Universiteit Delft, Delft (NL)

( * ) Notice: Subject to any disclaimer, the term of this patent is extended or adjusted under 35 U.S.C. 154(b) by 0 days.

(21) Appl. No.: 09/218,519

(22) Filed: Dec. 22, 1998

(51) Int. Cl.$^7$ ................................................ C01D 7/00
(52) U.S. Cl. ................. 423/426; 23/302 T; 423/206.1; 423/427
(58) Field of Search ................ 23/302 T, 302 R; 423/206.1, 419.1, 421, 426, 427

(56) References Cited

U.S. PATENT DOCUMENTS

| | | | |
|---|---|---|---|
| 2,670,269 A | 2/1954 | Rahn | 23/63 |
| 3,425,795 A | * 2/1969 | Howard | 23/303 |
| 3,486,844 A | 12/1969 | Tabler | 23/63 |
| 3,725,014 A | 4/1973 | Poncha et al. | 23/300 |
| 3,796,794 A | 3/1974 | Ilardi et al. | 423/421 |
| 3,933,977 A | 1/1976 | Ilardi et al. | 423/206 T |
| 3,975,499 A | 8/1976 | Walden | 423/179 |
| 4,104,033 A | 8/1978 | Mahn et al. | 23/300 |
| 4,183,901 A | 1/1980 | Ilardi et al. | 423/206 T |
| 4,374,102 A | 2/1983 | Connelly et al. | 423/206 |
| 4,879,042 A | 11/1989 | Hanson et al. | 210/642 |
| 5,716,419 A | 2/1998 | Larsen | 23/300 |
| 6,022,385 A | 2/2000 | Bowman | 23/302 |

FOREIGN PATENT DOCUMENTS

| | | | |
|---|---|---|---|
| EP | 0 191 512 A1 | 8/1986 | ................ 423/426 |
| FR | 1266274 | 5/1961 | |
| GB | 0748443 | 11/1953 | |
| GB | 2109783 | 6/1983 | ............ C01D/7/24 |

OTHER PUBLICATIONS

Chemical Abstracts, vol. 99, 124927 (1983).
D. A. Weingaertner et al., "Extractive Crystallization of Salts from Concentrated Aqueous Solution", Ind. Eng. Chem. Res. 1991, 30, 490–501.
Chemical Abstracts, vol. 92, 183082v (1980).
Chemical Abstracts, vol. 99, 124927w (1983).

* cited by examiner

Primary Examiner—Steven P. Griffin
Assistant Examiner—Maribel Medina
(74) Attorney, Agent, or Firm—Fitch, Even, Tabin & Flannery

(57) ABSTRACT

A process is presented in which anhydrous soda is crystallized and worked up to produce anhydrous soda crystals with a bulk density from 1300 to 1600 kg/m$^3$. The process is characterized in that a solvent is used that allows the crystals to be formed and handled at atmospheric pressure in the presence of water without the monohydrate of soda being formed.

17 Claims, No Drawings

PRODUCTION OF WATER-FREE SODA

The invention relates to a process for producing anhydrous soda (sodium carbonate, $Na_2CO_3$) with a bulk density of between 1300 and 1600 kg/m$^3$, generally by means of crystallization of soda, optionally after or during calcination of sodium bicarbonate, from a composition comprising an aqueous medium, sodium carbonate, optionally sodium bicarbonate, and a water-miscible organic solvent.

Such a process is described by D. A. Weingaertner, et.al. in *Ind. Eng. Chem. Res.*, Vol. 30, No.3, 1991, pp. 490–501. More specifically, it is disclosed that a hot, dry, and (partially) water-miscible solvent is added to an aqueous medium containing sodium carbonate to extract water, The extraction of water from the medium causes (part of) the soda to crystallize. The soda is filtered off, the wet solvent is recycled into dry solvent, and the filtrate is recycled to the feed. To ensure that anhydrous soda is produced, the temperature is kept above the monohydrate transition temperature of 109° C. as long as the soda is in contact with water. Because this temperature is above the boiling point of the composition at atmospheric pressure, the whole process is conducted under positive pressure. Before the pressure is released, the soda crystals are washed with hot solvent to further remove water. Additionally, the crystals are dried in such a fashion that all liquid adhering to them is removed before the temperature drops below 109° C., to eliminate all possibility of crystal hydration.

This process, if conducted at temperatures below 140° C., requires the use of large amounts of solvent, because at such temperatures the organic phase contains a maximum of 35% of water. To avoid the use of such large amounts of solvent, the temperature is raised to 180° C. and higher. The pressure in the crystallization, washing, and filtration equipment will, consequently, be high.

The use of large amounts of solvent during the crystallization is undesired from both an economical and a handling point of view. A high temperature during crystallization is undesired because of the energy requirements associated therewith. High pressure in the crystallizer and work-up section is undesired because it requires the use of complicated equipment and makes control and handling of the process more difficult, Also, the washing step is undesired because it increases the overall processing time and requires the use of extra solvent, with the associated disadvantages.

Therefore, there is a need for a process for making anhydrous soda with a high bulk density that does not require the use of large amounts of solvent, high temperatures, high pressures, nor, preferably, washing steps.

During our investigations it was found that all of the undesired process conditions and/or process steps are related to the underlying problem that there is no feasible process for crystallizing and/or handling anhydrous soda in an aqueous medium at atmospheric pressure. In conventional processes, the boiling point (at atmospheric pressure) of the aqueous medium from which the soda is precipitated is lower than the monohydrate transition temperature. Further study led us to a new and surprisingly simple process for making anhydrous soda with a high bulk density wherein the crystals can be treated and processed at atmospheric pressure and in the presence of water, without monohydrate being formed.

The new process is characterized in that at least part of the process, when both sodium carbonate and water are present, is conducted at atmospheric pressure while using from 1 to 50 percent by weight, based on the weight of the total composition, of at least one water-miscible organic solvent to increase the boiling point of the composition to above the monohydrate transition temperature of soda in said composition.

It is noted that GB-A-2 024 187 discloses that in an aqueous medium comprising soda, 10 to 22% by weight of sodium chloride can be used to increase the boiling point of the medium and to lower the monohydrate transition temperature, so that the boiling point temperature becomes higher than the transition temperature. However, the use of salt is highly undesired because it contaminates the anhydrous soda and because the hot, sodium chloride-containing solution is highly corrosive, leading to numerous problems in commercial installations. GB-A-2 024 187 does not suggest using water-miscible solvents instead of sodium chloride.

It is noted that U.S. Pat. No. 4,183,901 discloses a process to make anhydrous soda wherein 25 to 5000 parts per million by weight of an additive selected from the group consisting of specific maleic-acid-alkanol telomers, sodium tripolyphosphate, benzoic acid, phenol, and mixtures thereof are used. Said additives reduce the temperature of transition of sodium carbonate monohydrate to crystalline anhydrous sodium carbonate and are preferably used in such small proportions that no detectable change in boiling point is observed.

For the sake of good order, it is mentioned that the person skilled in the art will understand that the solvent which is used in the new process must fulfill a number of requirements if its use is to be allowed, especially in commercial processes. Besides meeting requirements in respect of safety, environmental, and economical concerns, the solvent preferably also does not adversely influence: a) the formation and growth of soda crystals by acting as a nucleation or growth inhibitor, b) the solubility of the soda in the aqueous phase, and c) the viscosity of the crystallizing mixture. Furthermore, the solvents preferably d) have a sufficiently high boiling point, e) are acceptable in trace amounts in soda, because such a contamination of the soda can hardly be avoided, and f) are stable under wet calcining conditions of up to 150° C. By "stable under wet calcining conditions" is meant that the solvent, under such conditions, essentially does not hydrolyze, does not react with other compounds in the composition, and does not undergo cyclization or ring-opening reactions. In a process wherein crystallization takes place during wet calcination, such a crystallization/calcination step generally precedes one or more further steps which can be conducted at atmospheric pressures and in the presence of water, without soda monohydrate being formed.

Without wishing to be restricted to such a theory, Applicant believes that by using a solvent in the process according to the invention, the monohydrate transition temperature of the soda is lowered. At the same time, the boiling point of the aqueous medium will depend on various parameters such as the types and concentrations of the compounds in it. Increasing the amount of appropriate solvent in the aqueous medium increases the boiling point, In order to avoid the necessity of using large amounts of solvent, which is required when the monohydrate transition temperature has to be lowered too much, the boiling point of the solvent preferably is above 80° C. More preferably, the boiling point of the solvent is above 95° C., while it is most preferred to use a solvent with a boiling point above 100° C. If the solvent forms an azeotrope with one or more of the other compounds in the aqueous medium, the boiling point of the azeotrope is to be substituted for the boiling point of the solvent.

In a further preferred embodiment of the process according to the present invention, the mother liquor comprising water, solvent, soda, and contaminants which remains after crystallization of the soda is recycled to the feed of the soda process. Such existing or desired recycle streams in the total process (e.g., the filtrate of the crystals) may require that (part of) the solvent be recycled to the calcination step of the process. Hence, it is foreseen that the solvent is present during the calcination step. If such recycle streams are indeed present, certain contaminants that are present in the feed can build up, since, ideally, only anhydrous soda is removed. To remove such contaminants, preferably (part of) the recycle stream is purged or further treated. In the latter case, (part of the recycle stream optionally is first subjected to an additional evaporation step wherein water is removed, to further crystallize soda from it. Because the solvent is still present in this step, also this crystallization step can be performed at atmospheric pressure without soda monohydrate being formed. Preferably, (part of) the mother liquor resulting from the first or optional second step is submitted to an additional evaporation step wherein water is evaporated. Consequently, the solvent/water ratio is further increased, and the ratio of water+solvent to salts further decreased, resulting in the precipitation of (part of) said contaminants. If so desired, the solvent/water ratio may also be increased by other means such as addition of solvent, selective pervaporation, membrane separation, and the like. By precipitating the contaminants, their build-up in the soda crystallization process can be avoided. Depending on the types and amounts of contaminants that are precipitated, the skilled person may discard them or recycle them to other parts of the soda process or to other processes, e.g., to the sodium chloride feed used to make (bi)carbonate. Preferably, the mother liquor that remains after these evaporation step(s) is recycled to the feed of the first crystallization/calcination step of the first embodiment.

Whether or not a solvent fulfills the requirements above, and hence is suitable for use in the process according to the invention, can be determined by simple tests. A first screening method for suitable solvents is to verify that the solvent is miscible in an amount of 1–10 percent by weight (% w/w), based on the total weight of the final composition, with a solution of 15 parts by weight (pbw) of soda and 85 pbw of water at 90° C., without the soda precipitating. Furthermore, to ensure the economical feasibility of the solvent, it is proposed to verify that a mixture of 95 pbw of water and 5 pbw of solvent at 90° C. can dissolve at least 15 pbw of anhydrous soda. More preferably, at least 20 pbw of anhydrous soda is soluble in a mixture of 95 pbw of water and 5 pbw of solvent at 90° C. Further tests include the evaluation of the resulting compositions for boiling point, composition at the boiling point temperature, stability, and viscosity, all at atmospheric pressure. In this respect it is noted that the presence in or absence from the composition of soda monohydrate at the boiling point temperature can easily be determined by any one of the following three methods after sufficient water has evaporated from the solution to obtain a slurry:

1) a sample of the slurry is centrifuged or filtered to remove (most of) the adhering liquid at a temperature equal to the boiling point temperature. Optionally, the sample is rinsed with a dry water-miscible solvent (such as acetone). Subsequently, the sample's water content is analyzed in a conventional way by means of Karl-Fisher titration or by gravimetric analysis upon (thermal) drying, and the amount of $HCO_3^-$ and $CO_3^{2-}$ is analyzed by means of titration with an acid (observing the titration end-points at about pH 6.3 and about pH 10.2).

2) determining the morphology of the crystals in the slurry with the aid of a microscope. Soda anhydrate is visual in the form of tabular hexagonal platelets, while monohydrate crystals have the form of elongated flat crystals with either eight-side faces (typical angles 140.9 and 129.1°) or six-side faces (typical angles 117.7 and 127.8°). The method is described in *Separation and purification by crystallization*, ACS symposium series 667, Ed. G. D. Botsaris and K. Toyokura, p. 233.

3) in-line powder X-ray diffraction on the slurry.

When in such a test the soda in the boiling slurry is in the anhydrous form, the solvent can be used in a process according to the invention.

Preferably, the solvents are selected from mono-alcohols, polyols, ethers, aldehydes, amines and ketones. More particularly;

the mono-alcohols preferably are aliphatic alcohols, the group of polyols, consisting of compounds with more than one hydroxyl group, was found to encompass very suitable solvents. However, when selecting a polyol, it is to be ensured that the polyol is sufficiently stable under crystallization/calcining conditions. Saccharides, for example, are within the group of polyols, but were found to be of less interest mainly because exposure to crystallization/calcining conditions over a prolonged period of time resulted in ring-opening and gluconic acid formation, which acid interfered in the crystallization process. Gluconic acid, like most organic acids, will form a carboxylate anion which functions as a growth retarder/inhibitor. Nevertheless, most polyols are readily suitable as solvents.

Amines, especially those with two or more amine groups per molecule, are generally usable as a solvent in the process according to the invention. However, the smell, cost, and potential carbamate formation can prohibit their use.

Because of solubility and boiling point considerations, mono-alcohols as well as ethers, aldehydes, and ketones are less favoured than the group of polyols.

Also, it is noted that the solvents preferably do not comprise an ester function, since these esters can hydrolyze under crystallization/calcining conditions, resulting in the undesired carboxylate anion.

More preferably, the solvents are selected from low-molecular weight polyols, such as diols and triols, with a molecular weight below 2000 Dalton, most preferably below 1000 Dalton, condensed polyols, such as diethylene glycol and polyethylene/propylene glycols, and polyamines. Typical examples of such more preferred solvents useful in the process according to the invention are ethylene glycol, diethylene glycol, glycerol, 1,2-propanediol, 1,3-propanediol, 1,2-butanediol, 1,3-butanediol, 1,4-butanediol, polyethylene glycol, such as PEG 200 and PEG 400 with an average molecular weight of 190–210 and 380–420, respectively, polypropylene glycol, polyethylene/propylene glycol and/or mixtures thereof. Most preferred solvents include the group consisting of ethylene glycol, glycerol, and 1,2-propanediol.

Typically, the solvents are used in a concentration of between 1 and 50% w/w of the total crystallizing mixture. Preferably, a concentration between 2 and 40% w/w is used. In order to reduce the contamination of anhydrous soda with the solvent to a minimum, especially when a washing step is not foreseen for the crystallized soda, it is advantageous to use the solvent in an amount below 20% w/w, more preferably below 15% w/w, of the total crystallizing mixture. Favourable results were obtained using concentrations of between 5 and 10% w/w of the total crystallizing mixture.

Because of the use of the solvent, the crystallization process of anhydrous soda is easy to control, since it can be performed at atmospheric pressure. In conventional crystallization processes, water is introduced into the crystal (present in the form of the monohydrate or other hydrate of soda) which later is to be removed, e.g., by applying heat. The removal of water from the lattice results in voids that lower the bulk density of the final soda crystals. The anhydrous soda from conventional processes, therefore, often has a bulk density below 850 kg/m$^3$. Even after compaction, e.g., by heat densification techniques, the bulk density remains below 1200 kg/m$^3$. By means of the process according to the invention, anhydrous soda is crystallized which is essentially free of contaminants and contains a much lower amount of voids. Hence, the bulk density of the anhydrous soda so obtained is much higher and from about 1300 to 1600 kg/m$^3$. Such soda is typically dubbed "super dense soda." There can be quite a variation in the bulk density of the product still, because not all of the crystallized soda need be in the anhydrate form. Depending on the actually used crystallization process, it is preferred that at least 10% w/w, preferably more than 25% w/w, and even more preferably more than 50% w/w, of the soda crystals is anhydrous. Most preferred is a process wherein more than 75% w/w of all crystallized soda is anhydrous.

The wet calcination/crystallization step according to the invention can be part of any conventional process wherein soda is crystallized. The crystallization of the soda can occur during calcination of the bicarbonate, which generally is the main constituent of the feed, in a separate crystallization step, or in both steps. Generally, the wet calcination reaction is conducted at temperatures up to 150° C., and as a rule the use of a solvent in this part of the process is not required (since the temperature is above the monohydrate transition point). Hence, the advantages of the process are clearest in a separate crystallization step or in further processing steps, as presented below, that can now be conducted and controlled at atmospheric pressure.

After crystallization, the crystallized soda usually is worked up to produce dried soda crystals. Generally, the work-up procedure includes a filtration and a drying step. Because these steps can now be conducted at atmospheric pressure without soda monohydrate being formed, the whole process for making anhydrous soda with a bulk density between 1300 and 1600 kg/m$^3$ is substantially improved.

Furthermore, it is noted that the solvent can be present during any part of the calcination/crystallization process. In this respect it is irrelevant what process mode is used, e.g., continuous or batch operations, high or low pressure, high or low temperature, and it is also irrelevant what source is used to produce the aqueous medium comprising soda, e.g., (calcined) trona and other ores, (calcined) sodium bicarbonate, hydrated soda or low-density anhydrous soda.

The invention is elucidated by the following examples.

EXAMPLES

Materials Used

Sodium carbonates anhydrous ex Baker (Baker grade)
Sodium bicarbonate ex Baker (Baker grade)
Glycerol ex Baker (Baker analyzed reagent)
1,2-Propanediol ex Fluka Chemica (Purum≧98% GC)
Ethylene glycol ex Fluka Chemica (Puriss. p.a.≧99.5% GC)

Procedure

The amounts of carbonate and bicarbonate in a sample were calculated in the usual way by analyzing a conventional acid-base titration of a solution of approx. 100 mg of soda crystals in 20 ml demineralized water with a standard 0.1 mol/l HCl solution.

Example 1

1380 g of demineralized water, 120 g ethylene glycol, and 400 g of anhydrous soda were mixed and heated in a jacketed glass vessel. The solution started to boil at 107° C. Keeping its temperature at 107° C., the solution was slowly concentrated by evaporation of water. At 10-minute intervals, 1 g of anhydrous soda crystals (seeds) was added to the boiling solution. Once these crystals no longer dissolved in the solution, the then obtained slurry was boiled down further for a period of 45 minutes. Subsequently, a sample of 300 ml of the slurry was withdrawn and immediately centrifuged for 5 minutes at 4500 rpm. The centrifuge was preheated to 80° C. and had a rotor diameter of 15 cm.

Analysis of the crystals thus obtained showed that 94% by weight of them consisted of $Na_2CO_3$ crystals. Further study showed that at least 4% w/w of the sample consisted of adhering liquid. Hence, at most approximately 2% w/w of water was present in the crystals in the form of soda monohydrate. Therefore, the amount of anhydrous soda in the sample is at least 85% w/w and the amount of monohydrate is less than 15% w/w, for all crystals.

Comparative Example A

The previous experiment was repeated, except that the ethylene glycol was omitted. The boiling point of the solution was 104.5° C.

74.2% w/w of the crystals consisted of $Na_2CO_3$, which corresponds to 100% of soda monohydrate, given that approximately 13% w/w of liquid adhered to the crystals.

What is claimed is:

1. A process for making anhydrous soda with a bulk density of between 1300 and 1600 kg/m$^3$ from a composition comprising an aqueous medium, sodium carbonate, optionally sodium bicarbonate, and a water-miscible organic solvent, comprising:

conducting at least part of the process, when both sodium carbonate and water are present, at atmospheric pressure while using from 1 to 50 percent by weight, based on the weight of the total composition, of at least one water-miscible organic solvent to increase the boiling point of the composition to above the monohydrate transition temperature of soda in said composition; and crystallizing anhydrous soda.

2. A process according to claim 1, wherein the water-miscible organic solvent is used in a concentration between 2 and 40 percent by weight of the total composition.

3. A process according to claim 2, wherein the solvent constitutes between 5 and 10% by weight of the total composition.

4. A process according to claim 1, wherein the boiling point of the solvent is higher than 80° C.

5. A process according to claim 1, wherein at least 15 parts by weight of anhydrous soda are dissolved at 90° C., in a mixture of 95 parts by weight of water and 5 parts by weight of solvent.

6. A process according to claim 1, wherein the solvent is stable under conditions suitable for calcining soda.

7. A process according to claim 1, wherein the solvent is selected from the group consisting of mono-alcohols, polyols, ethers, aldehydes, amines, ketones, and mixtures thereof.

8. A process according to claim 7, wherein the solvent is selected from the group consisting of low-molecular weight polyols with a molecular weight below 2000 Daltons, condensed polyols, polyamines, and mixtures thereof.

9. A process according to claim 8, wherein the solvent is at least one selected from the group consisting of ethylene glycol, diethylene glycol, glycerol, 1,2-propanediol, polyethylene glycol, polypropylene glycol, polyethylene/-propylene glycol and mixtures thereof.

10. A process according to claim 1, wherein the anhydrous soda is dried and has a bulk density of 1300–1400 kg/m$^3$.

11. A process according to claim 1, wherein the process further includes subjecting crystallized soda to a filtration or centrifuge step and an optional drying step.

12. A process according to claim 11, wherein the filtration or centrifuge step and the optional drying step are conducted at atmospheric pressure.

13. A process according to claim 11, wherein the filtration or centrifuge step yields a filtrate and said process comprises the further step of recycling said filtrate to a calcination and/or crystallization step.

14. A process according to claim 11, wherein in said process the filtration or centrifuge step yields a filtrate which at least a portion thereof is subjected to at least one additional crystallization step to remove salts other than soda, which were introduced into the process as contaminants of the feed, by crystallization.

15. A process according to claim 1, wherein the boiling point of the solvent is higher than 90° C.

16. A process according to claim 1, wherein the boiling point of the solvent is higher than 100° C.

17. A process according to claim 7, wherein the solvent is selected from the group consisting of low-molecular weight polyols with a molecular weight below 1000 Daltons, condensed polyols, polyamines, and mixtures thereof.

* * * * *